US006484166B1

(12) United States Patent
Maynard

(10) Patent No.: US 6,484,166 B1
(45) Date of Patent: *Nov. 19, 2002

(54) INFORMATION MANAGEMENT, RETRIEVAL AND DISPLAY SYSTEM AND ASSOCIATED METHOD

(75) Inventor: George Maynard, Wooster, OH (US)

(73) Assignee: Evresearch, Ltd., Columbus, OH (US)

( * ) Notice: Subject to any disclaimer, the term of this patent is extended or adjusted under 35 U.S.C. 154(b) by 40 days.

This patent is subject to a terminal disclaimer.

(21) Appl. No.: 09/733,378

(22) Filed: Sep. 27, 2000

Related U.S. Application Data

(63) Continuation of application No. 09/315,316, filed on May 20, 1999, now Pat. No. 6,175,830.

(51) Int. Cl.[7] ............................................. G06F 17/30
(52) U.S. Cl. ................................. 707/5; 704/9; 706/47
(58) Field of Search ............................. 707/1, 2, 3, 4, 707/5; 704/9; 706/47

(56) References Cited

U.S. PATENT DOCUMENTS

| | | | |
|---|---|---|---|
| 5,265,065 A | 11/1993 | Turtle | 395/600 |
| 5,404,510 A | 4/1995 | Smith et al. | 395/600 |
| 5,546,529 A | 8/1996 | Bowers et al. | 395/159 |
| 5,537,586 A | 9/1996 | Amram et al. | 707/3 |
| 5,642,502 A | 6/1997 | Driscoll | 395/605 |
| 5,675,710 A | 10/1997 | Lewis | 395/10 |
| 5,708,806 A | 1/1998 | DeRose et al. | 395/615 |
| 5,778,157 A | 7/1998 | Oatman et al. | 395/51 |
| 5,784,608 A | 7/1998 | Meske, Jr. et al. | 395/602 |
| 5,790,121 A | 8/1998 | Sklar et al. | 345/356 |
| 5,848,410 A | 12/1998 | Walls et al. | 707/4 |
| 5,855,015 A | 12/1998 | Shoham | 707/5 |
| 5,864,863 A | 1/1999 | Burrows | 707/103 |
| 5,870,559 A | 2/1999 | Leshem et al. | 395/200.54 |
| 5,870,735 A | 2/1999 | Agrawal et al. | 707/3 |
| 5,890,147 A | 3/1999 | Peltonen et al. | 707/1 |
| 5,895,470 A | 4/1999 | Pirolli et al. | 707/102 |
| 5,924,090 A | 7/1999 | Krellenstein | 707/5 |
| 5,948,058 A | 9/1999 | Kudoh et al. | 709/206 |
| 5,953,718 A | 9/1999 | Wical | 707/5 |
| 5,963,940 A | 10/1999 | Liddy et al. | 707/5 |
| 5,999,925 A | 12/1999 | Evans | 707/5 |
| 6,006,221 A | 12/1999 | Liddy et al. | 707/5 |
| 6,175,830 B1 | 1/2001 | Maynard | 707/5 |

OTHER PUBLICATIONS

Liddy, E.D. and Myaeng S.H. "Dr–Link System: Phase I Summary" Proceedings of the Tipster Phase I Final Report, Sep. 1993 (published 1994), pp. 93–110.

*Primary Examiner*—Jack Choules
(74) *Attorney, Agent, or Firm*—Thompson Hine LLP

(57) ABSTRACT

An information management, retrieval and display system searches through an informational resource, such as a document (e.g., a treaty), a number of individual documents (e.g., Web pages resident on the Internet), or a stream of information (e.g., DNA code, source code, satellite data transmissions, etc.) and displays the results of the search in an collapsible/expandable format based upon a user-selected display criteria or hierarchy. Such a display hierarchy will allow the end-user to effectively and quickly obtain items of interest from the search results. Generally, the system performs a method for retrieving information from an informational resource that includes the steps of: (a) dividing the informational resource into a plurality of finite elements; (b) assigning a categorical tag to each of the plurality of finite elements, where the categorical tag includes data pertaining to a content of the finite element; (c) generating a searchable database record for each of the plurality of finite elements, where each searchable database record includes at least one string contained within the finite element, where the string can be a word, a phrase, a symbol, a group of symbols, a data segment or the like; (d) supplying a search string; (e) searching the searchable database for searchable database records containing the search string; (f) arranging the results of the searching step in a hierarchal structure according, at least in part, to the data in the categorical tags assigned to the finite elements found in the searching step; and (g) displaying the results of the searching step in the hierarchal structure.

32 Claims, 7 Drawing Sheets

INFORMATION MANAGEMENT, RETRIEVAL AND DISPLAY SYSTEM AND ASSOCIATED METHOD

CROSS REFERENCE TO RELATED APPLICATIONS

This application is a continuation of U.S. application Ser. No. 09/315,316, filed May 20, 1999 now U.S. Pat. No. 6,175,830.

BACKGROUND

The present invention is a computerized system and method for searching through and retrieving information from an informational resource; and more particularly, the present invention is an information management, retrieval and display system for searching through an informational resource and for displaying the results of the search in an collapsible/expandable format based upon a user-selected display criteria or hierarchy.

An inherent drawback in many conventional search engines or search tools, such as Infoseek™, AltaVista™, Hotbot™, is that the results of the search are typically organized according to the number of hits that the search word or phrase made in each document (Web page) being searched. This type of search result display requires the end user to go through the hits one by one in order to finally access the document he/she was looking for. Another drawback with such conventional search engines is that the results of the search do not take into account that a word may have several different meanings, and may be used in many different contexts. For example, if an end user were looking for information on a cartoon mouse, because the search query would contain the word "mouse," the list of hits will include documents for the electronic cursor-control devices, documents providing biological information on mice, documents providing pet information on mice, etc. Therefore, the end user may have to go through an enormous number of these hits before finally (if ever) reaching a hit related to the cartoon mouse.

Thus, there is a need for a search engine or search tool that allows the end user to that arranges the search results in a manner that allows the end user to effectively and quickly obtain items of interest.

SUMMARY

The present invention is an information management, retrieval and display system for searching through an informational resource, such as a document (e.g., a treaty), a number of individual documents (e.g., Web pages resident on the Internet), or a stream of information (e.g., DNA code, source code, satellite data transmissions, etc.) and for displaying the results of the search in an collapsible/expandable format based upon a user-selected display criteria or hierarchy. Such a display hierarchy will allow the end-user to effectively and quickly obtain items of interest from the search results. The type or format of the informational resource is not critical.

The invention includes four primary modules, a break module, an indexing module, a search module and an un-break module. The break module is an expert system operating upon a set of expert rules that define its operation. The break module parses through the informational resource to break up the informational resource into finite elements (such as paragraphs, sections, sub-sections, segments etc.). The break module also creates categorical tags for each of these finite elements, where the categorical tags assigned to each of the finite elements are based upon and analysis (defined by the set of expert system rules) of the contents of each of the finite elements. The categorical tag can include a standard classification such as, for example, "Dewey Decimal-type" number. The categorical tag can also include an organizational attribute (such as pertaining to the type or location of the finite element with respect to the rest of the rest of the informational resource), a date-stamp, a categorical word, etc. Preferably, the categorical tags are inserted into the finite element.

The index module parses through the finite elements identified/created/processed by the break module and creates a searchable database having a database record for each of the finite elements identified by the break module. The searchable database is a type of reverse index, where each record includes an address or location of the corresponding finite element (and, in turn, the categorical tag included therewith), and strings (such as words, phrases, etc.) contained in the finite element and their frequency (i.e., their weight) within the finite element.

In applications where the users of the invention do not have control of the information being searched (i.e., Web pages on the Internet), each database record may also include the categorical tag, since the categorical tag will not be able to be inserted by the break module into the finite elements themselves. Furthermore, with the Web search application, it may not be necessary to utilize the break and un-break modules at all since each Web-page or link might be considered a finite-element for the purposes of the present invention.

Once the reverse index is created, a search of the reverse index may be performed. Key strings (such as key words, phrases or symbol segments) may be supplied by an end user as a search query, and a display hierarchy or criteria may also be selected or defined by the user. The selected display criteria will instruct the search module how to manipulate the data of the search results. Specifically, the selected display criteria will define if the search results are to be displayed in an order or structure based entirely upon the information contained within the categorical tags (research-centric), if the search results are to be displayed in an order depending entirely upon the frequency of the key strings present in the finite elements (conventional), or if the search results are to be displayed in an order or structure based upon a combination of the two (document-centric).

The search module accesses the search query and searches through the reverse index for database records matching the specific search term or query. The search results are then displayed in an collapsible/expandable (tree) structure by applying the information in the categorical tags for each of the finite elements satisfying the search criteria to the selected display hierarchy. For example, if the selected hierarchy is a document-centric hierarchy, a first level of the display hierarchy may be, for example, the year in which the finite element was created; a second level of the display hierarchy may be, for example, the order in which the finite elements appear in the document; and a third level of the display hierarchy may be, for example, based upon the frequency in which the search words appear in each of the finite elements. The operation of the search module, as with the break and index modules, is based upon a set of expert rules. Therefore, if the search results are not satisfactory, the expert rules in the break, index and/or search modules are modified and the procedure is performed again.

Once one of the finite elements in the search result display are selected by the end-user, the un-break module allows the end user to view a contiguous portion of the informational resource that the selected finite element belongs to. The un-break module will assemble selected finite element with other related finite element to reconstruct the contiguous portion of the informational resource. The un-break module refers to the categorical tag of the selected finite element for information related to the location of the finite element with respect to the entire informational resource, and will then build a portion of the informational resource from all of the finite elements belong to that portion. For example, if the selected finite element is a paragraph of a document, the un-break module may be configured to rebuild the chapter of the document to which the paragraph belongs. As with the other modules of the present invention, the operation of the un-break module is controlled by a set of expert rules that may be modified if the results are unsatisfactory.

It is envisioned that the rule sets will be created and refined by an expert on the document or information being searched. For example, if the system of the present invention is to be associated with Volume 37 of the Code of Federal Regulations, an individual (or group of individuals) with intimate knowledge of the Volume would be best suited to generate and fine-tune the rule sets. The fine-tuning of the rule sets would involve the individual continuously performing example searches on the Volume using the rule sets, and continuously modifying the rule sets to obtain the search results with the desired content and format. Once the rule sets have been fine-tuned, the search module of the present invention can be packaged along with the Volume and sold or distributed as a searchable Volume. Likewise, the search module could operate on a Web-site so that users can access the Web-site and perform searches on the Volume. Since the rule sets have already been defined and fine-tuned by the "experts," the users would have a fully operable search engine that performs searches and displays results in accordance with an expert's intimate knowledge with the Volume.

As mentioned above, it is also envisioned that an embodiment of the invention is designed to search through a number of individual Web pages resident on the Internet and to display the results of the search in an collapsible/expandable format based upon a user-selected display criteria or hierarchy. In such an embodiment, a break module in the form described above may not be necessary because each Web page may already be considered to be a "finite element" and the search engine will not be able to modify the Web pages. Accordingly, in such an application, the index module will parse through each of the Web pages (finite elements) to create a searchable database having a record for each of the Web pages. Each record in the searchable database will include the Web address of the Web page, non-common words contained in the Web page along with their frequency (weight), and a categorical tag, as described above, which includes data based upon an analysis of the contents of the Web page. The index module will also review each of the Web pages to determine if the creator of the Web page had embedded a categorical tag into the Web page itself; and if such an embedded categorical tag is found, the index module may simply insert this pre-defined categorical tag into the database record rather than creating one itself. Therefore, as the present invention becomes more prevalently used on the Internet, Web page creators may desire to create their own categorical tags for their Web pages rather than having the search engine create one for them. With this feature, the Web page designer may be able to influence the search results, perhaps to achieve a more accurate depiction of the Web site. Of course, such a feature may also be used by the Web designers in a deceptive manner, where the categorical tag will cause the Web page to be listed in search results when the searcher is looking for an entirely different type of information. Recognizing this potential problem, the index module will include an option where it will compare the actual contents of the Web page against the embedded categorical tags, and will create a new categorical tag to be inserted into the database record if there is a significant difference. Likewise, the index module can be configured to filter out Web sites having undesirable or unsavory content as indicated by the embedded categorical tags or as determined by a review of the content of the Web page itself.

In another embodiment of the invention, the dynamic expert rule sets may be configured to accept and index all manner of static and dynamic information (such as news-feeds, data transmissions, etc.) on a global scale where an end-user will be able to efficiently and quickly obtain any sort of information he/she wishes from a hierarchal search result display based upon a categorical organization scheme such as the Dewey-Decimal system.

Thus, in one aspect of the present invention, a method for retrieving information from an informational resource comprises the steps of: (a) dividing the informational resource into a plurality of finite elements; (b) assigning a categorical tag to each of the plurality of finite elements, where the categorical tag includes data pertaining to a content of the finite element; (c) generating a searchable database record for each of the plurality of finite elements, where each searchable database record includes at least one string contained within the finite element, where the string can be a word, a phrase, a symbol, a group of symbols, a data segment or the like; (d) supplying a search string; (e) searching the searchable database for searchable database records containing the search string; (f) arranging the results of the searching step in a hierarchal structure according, at least in part, to the data in the categorical tags assigned to the finite elements found in the searching step; and (g) displaying the results of the searching step in the hierarchal structure.

The informational resource may be a single document, a plurality of documents or a stream of data, and the step of identifying the finite elements may include the steps of identifying sections or sub-sections within the document(s) or data stream or by simply identifying the documents themselves. The step of dividing the informational resource into a plurality of finite elements is preferably performed by an expert system according to a rule set; and the step of assigning a categorical tag to each of the plurality of finite elements is also preferably performed by an expert system according to another rule set. If unsatisfactory results are obtained in step (g) above, one or both of the rule sets may be modified by the end user and the steps (a) through (g) may be performed again.

Each database record preferably includes an address or pointer to the corresponding finite element and further preferably includes all of the non-common strings (e.g., words or phrases) contained within the corresponding finite element along with the frequency that such strings appear.

In another aspect of the present invention, a method for retrieving information from an informational resource includes the steps of: defining a first rule set for dividing the informational resource into a plurality of finite elements; utilizing the first rule set, dividing the informational resource into a plurality of finite elements; defining a second rule set for creating a categorical tag for one of the plurality of finite elements; utilizing the second rule set to create a categorical tag for each of the plurality of finite elements;

generating a searchable database including a searchable database record for each of the finite elements; searching the searchable database for relevant database records; associating the relevant database records found in the search with corresponding relevant finite elements; selecting a hierarchy for displaying identifying phrases pertaining to the relevant finite elements; ordering the relevant finite elements in the hierarchy according, at least in part, to the categorical tag for each of the finite elements; and displaying the identifying phrases pertaining to the relevant finite elements according to the results of the ordering step.

In another aspect of the present invention, a data storage device (such as a CD ROM) is provided, which comprises: an informational resource divided into a plurality of finite elements, where each of the finite elements includes a categorical tag and a database record assigned thereto, where the categorical tag includes data pertaining to a content of the finite element and the database record includes at least one string contained within the finite element; and also comprises software instructions programmed to retrieve and display at least a portion of the informational resource. The software instructions are configured to perform the steps of supplying a search string, searching through the database records for relevant database records containing the search string, arranging the results of the searching step in a hierarchal structure according to the information in the categorical tags assigned to the finite elements corresponding to the relevant database records, and displaying identifying phrases for the finite elements corresponding to the relevant database records in the hierarchal structure.

DETAILED DESCRIPTION

The present invention is an information management, retrieval and display system for searching through an informational resource, such as a document (e.g., a treaty), a number of individual documents (e.g., Web pages resident on the Internet), or a stream of information (e.g., DNA code, source code, satellite data transmissions, etc.) and for displaying the results of the search in an collapsible/expandable format based upon a user-selected display criteria or hierarchy. Such a display hierarchy will allow the end-user to effectively and quickly obtain items of interest from the search results.

Figure 1:
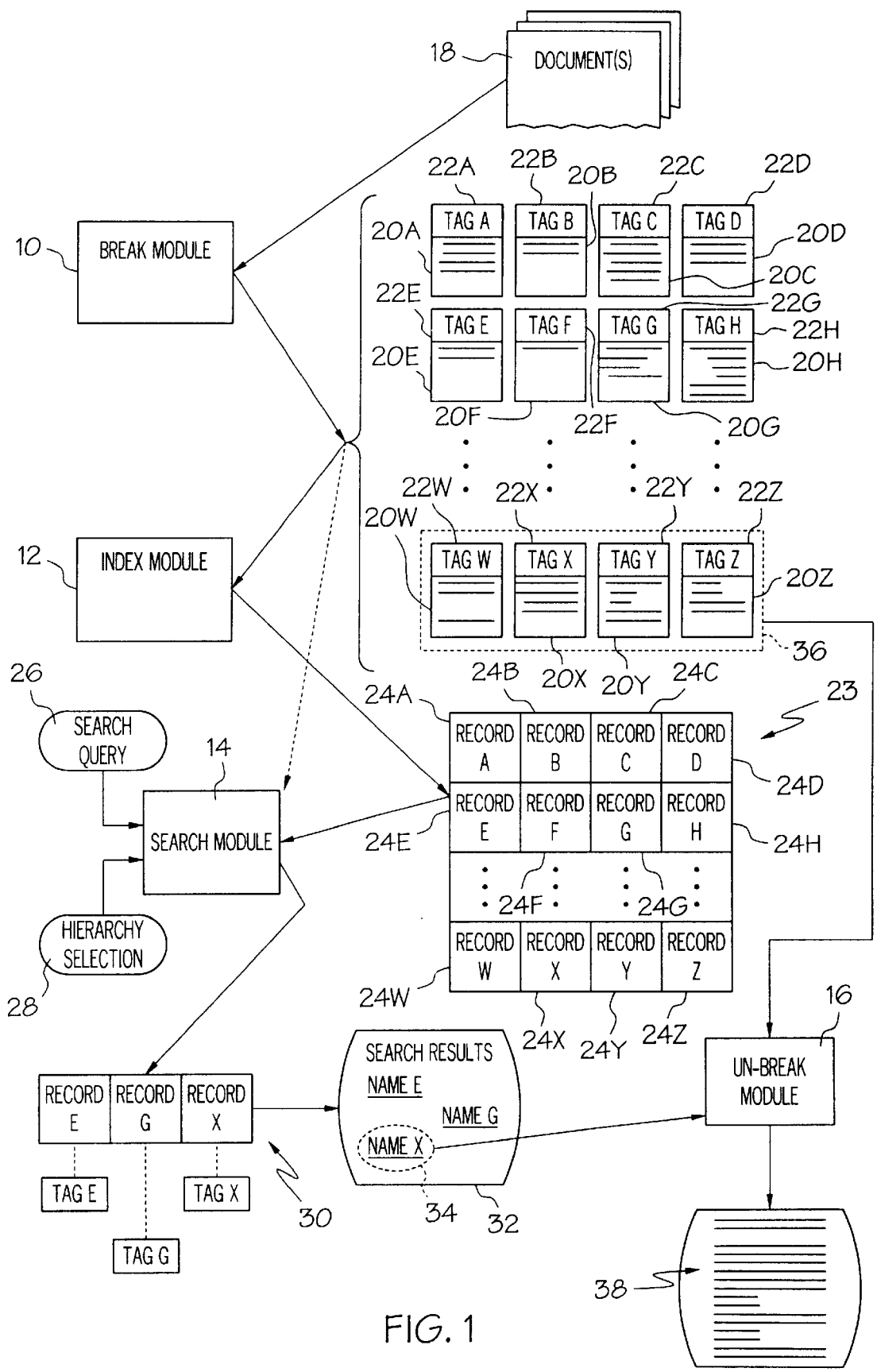
FIG. 1 is a schematic flow-diagram representation of the operation of a first embodiment of the present invention.

As shown in FIG. 1, in a first embodiment of the invention, the information management, retrieval and display system includes four primary modules, a break module 10, an indexing module 12, a search module 14 and an un-break module 16. Each of these processing modules are preferably expert engines operating upon a set of expert rules that define the operation of the individual module. As will be described in further detail below, the expert rules for these modules are preferably generated by a person or persons having intimate knowledge of the document or documents 18 being searched; and the fine tuning of the expert rules is a iterative process where the expert will modify or change the rules of one or more of the above modules if a search through the document or documents proves to be unsatisfactory.

The break module 10 parses through an informational resource, such as a group of documents 18 to break up the group of documents into "finite elements" 20a–20z. Each finite element is a user-defined "basket" of information from documents that is to be individually indexed and searched. The finite element is usually not a single word, phrase or symbol, but is a section or portion of an informational resource that can be identified and isolated by the break module. A simple example of a finite element would be the individual paragraphs of a document. Other examples of finite elements would include sub-chapters of a document, individual pages of a document, and other types of identifiable sections of a document. In some instances, the finite element can be the entire document itself. The break module is also responsible for analyzing the contents of each finite element 20a–20z and creating a categorical tag 22a–22z for each finite element, which is to be inserted into the finite element. The categorical tags 22a–22z may include a standard classification based upon the content analysis such as, for example, a "Dewey Decimal" type number, or some other categorical reference number. The categorical tag may also include an organizational attribute such as pertaining to the type of finite element or the location of the finite element within the document, a date stamp, a categorical word or phrase summarizing the contents of the finite element, etc. As will be discussed in detail below, the contents of each categorical tag provides information to the search module 12 so as to assist the search module in creating the hierarchical display of the search results.

The index module parses through each of the finite elements created by the break module and creates a searchable database 23 including a database record 24a–24z for each of the finite elements created by the break module. The searchable database 23 is a type of reverse index, where each record 24a–24z includes an address or location of the corresponding finite element and all words contained within the finite element (preferably excluding common words such as "and," "in," "the," . . . ) along with their frequency of appearance within the finite element (i.e., their weight).

At some point during the process, a user, which may be an end user or may be the expert developing the rule sets, will enter a search query 26 and an optional hierarchical selection 28. The search query may be any conventional search query as available to those of ordinary skill in the art and may include search words or phrases and/or operators tying the words together. The hierarchy selection informs the search module the type of display format that the user wishes to see the results displayed within. Specifically, the hierarchy selection will inform the search module whether or not the search results are to be displayed in an order or structure based entirely upon the information contained within the categorical tags (research-centric), if the search results are to be displayed in an order depending entirely upon the frequency of the key words or phrases present within the finite elements (conventional), or if the search results are to be displayed in an order or structure based upon a combination of the two (document-centric).

The search module will utilize the search query to search through the database records 24a–24z so as to find the database records 30 matching the words or phrases in the search query. The search module will then, depending upon the selected hierarchy 28, display the search results 32 in an order or collapsible/expandable tree structure based upon information from the categorical tags 22 included in the finite elements 20 that are associated with the records 30 matching the search query. For example, a first level of the display hierarchy might be ordered according to the chapters of a document that the finite elements are contained within. Information regarding the chapters that the finite elements are contained within will be resident within the categorical tags associated with the finite elements. A second level of the display results may order the finite elements for each chapter based upon the weight or frequency that the search words or phrases appear within each finite element. Therefore, on the search results screen the end user will select which chapter he or she would like to view a relevant finite element from and the display will then expand to show the finite elements from that chapter matching the search query. These finite elements contained within this chapter will be ordered depending upon the weight of the search query or words. From there, the user will make a selection 34 indicating to the un-break module 16 which of the finite elements the user wishes to view.

It will be appreciated by those of ordinary skill in the art that the different combinations of ordering schemes and tiers for any given hierarchy is virtually limitless. Other examples of ordering schemes and tiers can be based upon the topic of the finite element, the author or provider of the finite element, the time/date of the finite element, the position of the finite element with respect to the information resource, etc. It is also within the scope of the invention that the hierarchy only include one tier or level of ordering.

While it is preferred that the search module displays the search results in an collapsible/expandible tree structure, it is also within the scope of the invention that the display results be displayed in alternate hierarchal or tiered structures. An example of an alternate hierarchal/tiered structure is the use of a cascaded or tiled display to present the various levels of the hierarchy. Of course, if there is only one tier or level of ordering, the display structure would not need to be collapsible/expandable.

The search module may also be configured to recognize that a string in the search query may have other permeations, which may be used by the search engine to provide matches with the database records. For example, if the search query includes a word in a first language, it is within the scope of the invention for the search module to provide the word in other languages when looking for matches with the database records. Likewise, it is within the scope of the invention for the search module to provide other known forms or tenses of the word; and it is also within the scope of the invention for the search module to provide other search words having a similar or the same meaning.

The un-break module 16 accesses the categorical tag of the selected finite element 34 to determine the other finite elements 36 of the documents 18 that are to be grouped together so as to form the single contiguous display 38. For example, if the selected finite element 34 is a paragraph of the document, the un-break module 16 will refer to the categorical tags of the remaining finite elements to determine the other finite elements 36 that appear on the same page as the selected finite element so as to display the entire page 38 rather than the single paragraph. Likewise, the un-break module can group related finite elements together in a contiguous chapter, section, or other contiguous identifiable portion of the document or documents. Simply put, the un-break module is used for displaying the selected finite element in context with the remaining portions of the informational resource.

While it is preferred that the un-break module is utilized to reconstruct contiguous portions of the informational resource, it is within the scope of the invention to configure the expert rule sets of the un-break module to construct new informational resources using the selected finite elements and other finite elements from the original informational resource. For example, the un-break module may be configured to compile all of the finite elements matching the search query into a new informational resource, using the categorical tags for these finite elements to dictate the order in which the finite elements will be compiled. In another example, the un-break module may be configured to review the categorical tag of the selected finite element to determine other finite elements that are related to the selected finite element based on the date that the finite elements were created, or the author/owner of the finite element, or the content of the finite element; and the un-break module will then construct a new informational resource compiling all of the related finite elements.

Figure 2A:
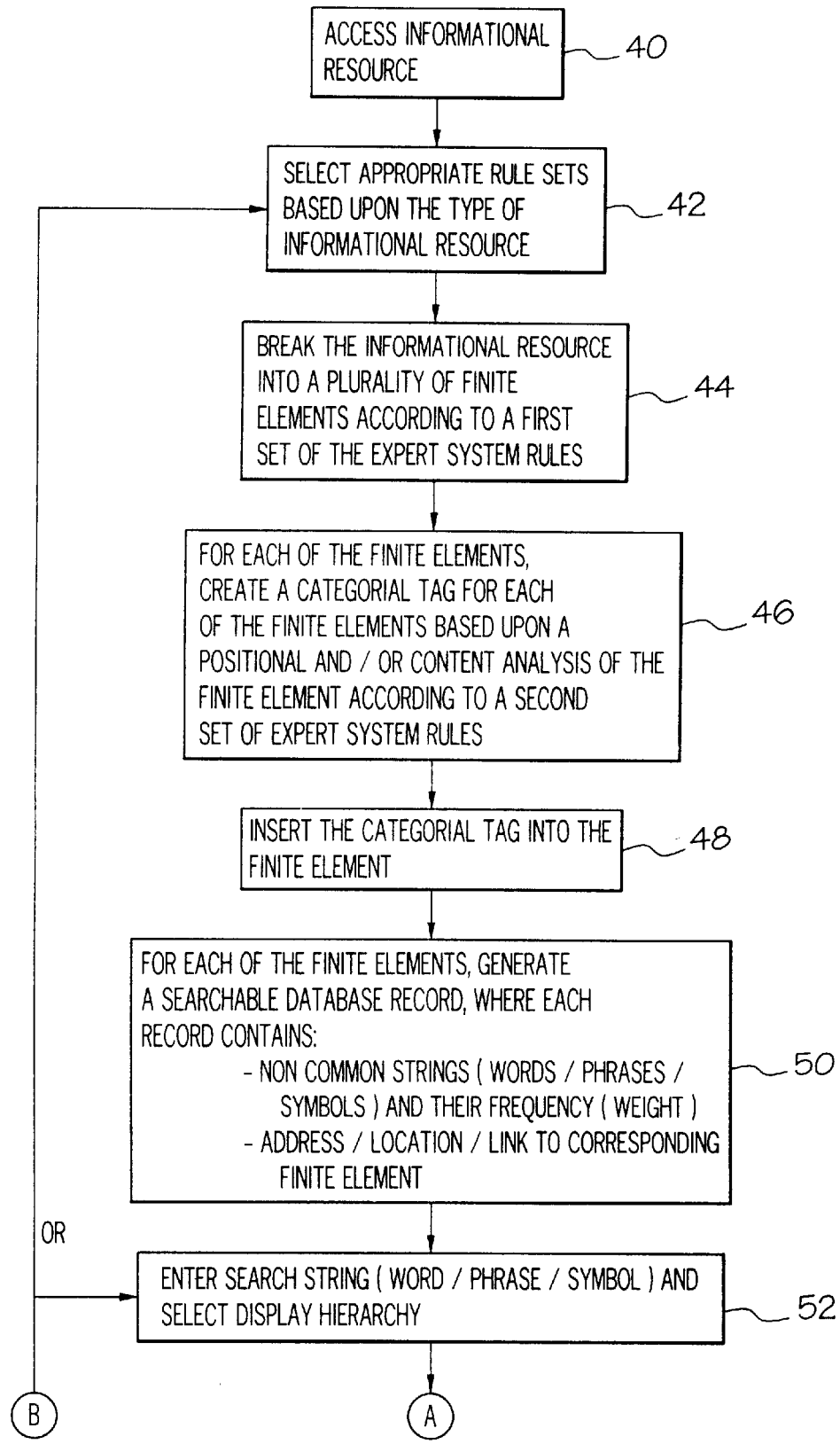
FIGS. 2A and 2B are flow-chart representations of the operation of the embodiment illustrated in FIG. 1.
Figure 2B:
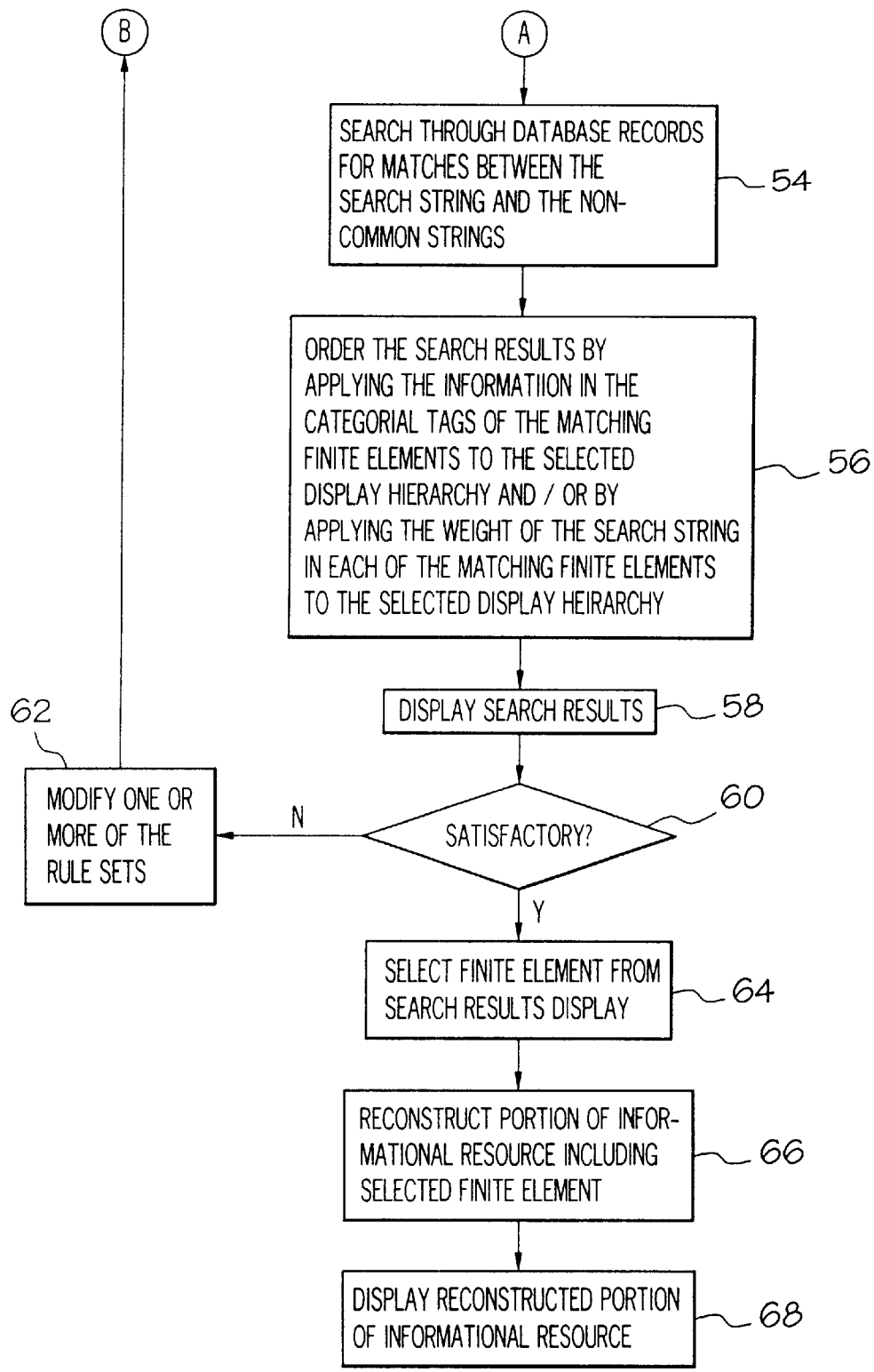

FIGS. 2A and 2B provide a flow chart representation of an operation of the information management, retrieval and display system for the embodiment described above. As shown in functional block 40, a first step is to access the informational resource being examined. As illustrated in functional block 42, the next step is to select the appropriate expert rule sets to apply for searching through the informational resource. The particular rule set selected will depend upon the type of information resource that was accessed in step 40. For example, a set of expert rule sets used for searching through and analyzing the Antarctic Treaty will be different than a set of rule sets used for analyzing and searching through volume 37 of the Code of Federal Regulations. As shown in functional block 44, the next step is to break the information resource into a plurality of finite elements according to a first set of the expert systems rules. As discussed above, this step involves breaking the informational resource into identifiable segments of information such as paragraphs, subsections, pages, chapters, subchapters and the like. An example rule set for breaking the Antarctic Treaty into a plurality of finite elements is provided below in Table 1.

TABLE 1

FINISHED EXAMPLE OF A 'RULE SET' FOR AUTOMATICALLY DIVIDING DOCUMENTS INTO SEGMENTS OR ELEMENTS[1]

| DOCUMENT DIVISION LEVELS | SPECIFIC DOCUMENT DIVISIONS | PATTERN MATCHING RULES |
| --- | --- | --- |
| Primary Level | Antarctic Treaty, Conventions, Protocol and its Annexes | Recogize by bolded large fonts centered on page |
| Secondary Level | Recommendations, Measures, etc. | Recognize by Roman numerals |
| Tertiary Level | Articles within documents from the primary or secondary levels | Recognize by medium fonts centered on page with a colon |
| Grouped Level | Antarctic Treaty Consultative Meeting | Group documents by their Roman numerals |

TABLE 1-continued

FINISHED EXAMPLE OF A 'RULE SET' FOR AUTOMATICALLY DIVIDING DOCUMENTS INTO SEGMENTS OR ELEMENTS[1]

| DOCUMENT DIVISION LEVELS | SPECIFIC DOCUMENT DIVISIONS | PATTERN MATCHING RULES |
|---|---|---|
| Appended Level | Year | Append the signature date for documents at the primary, secondary or grouped levels |

[1]Based on the public-domain documents in the Antarctic Treaty Handbook which has been published since the 1960's by the United States Department of State in hardcopy form only and which now has been converted into a searchable database.
[2]Source codes are described using JAVA but could easily be written in PERL or any other programming language. See Appendix A for example source code segments As shown in the above table, the example rule set is adapted to divide the Antarctic Treaty into a plurality of levels where a primary level of the Treaty, which involves the Antarctic Treaty, Conventions, Protocol and its Annexes, is recognized by the search engine by identifying bold, large font centered on a page. A secondary level, which are the Recommendations and Measures contained within the Treaty, are recognized by the search engine by identifying Roman numerals. A tertiary level is utilized to divide up the primary and secondary levels into smaller finite elements. This tertiary level of finite elements is recognized by the search engine by identifying medium fonts centered on a page with a colon. The remaining levels of the table should be apparent to those of ordinary skill in the art upon analyzing the table and the associated pattern matching rules.

Accordingly, the purpose of the above rule set is to create an automatic tool for matching patterns that distinguish hierarchies, segments or elements within any type of informational resource. The rule set is developed in relation to user-defined requirements for the segments or elements that need to be indexed and searched within the informational resource. It will also be apparent to those of ordinary skill in the art that the rule sets will be greatly simplified in informational resources that include already distinguished segments or elements, such as in separate columns or blocks. Preferably, the rule sets are designed by an expert having intimate knowledge of the informational resource, in an iterative manner utilizing feed-back loops as will be described below.

As shown in functional block 46, a next step is to create a categorical tag for each of the finite elements based upon a positional and/or content analysis of the finite element according to a second set of expert system rules. An example of a rule set for defining categorical tags for finite elements extracted from the Antarctic Treaty is provided below in Table 2.

TABLE 2

EXAMPLE OF CATEGORICAL TAGS THAT WERE AUTOMATICALLY ATTACHED TO FINITE ELEMENTS CREATED WITH THE USER-DEFINED 'RULE SETS' (SEE TABLE 1)[1]

| DOCUMENT DIVISION LEVELS | SPECIFIC DOCUMENT DIVISIONS |
|---|---|
| Primary Level | Antarctic Treaty, Conventions, Protocol and its Annexes |
| Secondary Level | Recommendations, Measures, etc. |
| Tertiary Level | Articles within documents from the primary or secondary levels |
| Grouped Level | Antarctic Treaty Consultative Meeting |
| Appended Level | Year |

[1]Based on the public-domain documents in the Antarctic Treaty Handbook which has been published since the 1960's by the United States Department of State in +hardcopy form only and which now has been converted into a searchable database.
[2]Source codes are described using JAVA but could easily be written in PERL or any other programming language. See Appendix A for example source code segments.

As shown in Table 2, the categorical tag will include notation indicating the finite element's position within each of the various identified levels of the Antarctic Treaty. For example, the categorical tag will include information indicating if on a primary level, the finite element is contained within the Antarctic Treaty, the Conventions, the Protocol or its Annexes. On a secondary level, the categorical tag will indicate whether or not the finite element is included in the Recommendations, Measures, etc. As shown in the bottom of the table, the categorical tag for each of the finite elements will also include a content base notation indicating the year that the particular section or finite element was created. Of course, the type and variations of positional and/or content base notations included in the categorical tags are virtually limitless. For example, the rule set may be configured to analyze the contents of the finite element so as to provide a categorical word or phrase which provides a clue to the user as to the contents of the finite element. Similarly, rather than utilizing a word or phrase, the rule set can analyze the contents or position of the finite element to provide a categorical reference number to the finite element, such as a Dewey Decimal type number.

As shown in functional step 48, a next step is to insert the categorical tag created above in step 46 into the finite element created in step 44. As shown in functional block 50, a next step is to generate, for each of the finite elements, a searchable database record. Each database record preferably contains the noncommon strings (e.g., words, phrases, symbols) contained within the finite element along with their frequency (i.e., weight). Furthermore, each database record will include an address, location or link to the corresponding finite element. As shown in functional block 52, a next step is to enter a search string such as a word, phrase or symbol(s) and to select a display hierarchy. As shown in functional block 54, a next step is to search through the database records created in functional block 50 for matches between the search string and the noncommon strings of the database records. This searching step will identify the relevant database records having noncommon strings matching the search string. As shown in functional block 56, the relevant database records found in the searching step 54 will be ordered by applying information from each of the categorical tags of the relevant database record's associated finite element to the selected display hierarchy and/or by applying the weight of the matching search strings in the relevant database records to the selected display hierarchy.

For example, a first level of the display hierarchy for the Antarctic Treaty might be the year that the finite element was created; the second level might be ordered according to the order of the Articles of the Antarctic Treaty; and a third level of the display hierarchy might be ordered according to the weight of the matching strings contained within the database records.

As shown in functional block 58, a next step would be to display the search results in the collapsible/expandable hierarchy on a display screen. As shown in functional block 60, the user will determine whether the search results were satisfactory, and if not the process will advance to functional block 62 where the user will modify one or more of the rule sets and will return either to functional block 44 or to functional block 52 depending upon which rule sets have been modified.

If, in functional block 60, the search results are satisfactory, the process will advance to functional block 64 where the user will select one of the finite elements from the search results display. Then in functional block 66, the categorical tag of the selected finite element will be used to identify other finite elements that are to be grouped together with the selected finite element to create a contiguous portion of the informational research to be displayed. Finally, in functional block 68, the contiguous portion of the informational resource will be displayed on the display screen or printed.

It is envisioned that an expert having intimate knowledge of the informational resource will develop the rule sets based upon his or her knowledge of the informational resource. Thereafter, once the rule sets have been fully developed, the feed-back portion of the above-described flow chart will no longer be necessary.

Furthermore, once the rule sets have been fully developed, the search module, the un-break module and the fully developed rule sets may be incorporated onto a data storage device (such as a CD ROM, a disk-drive, a floppy-disk and the like) along with an informational resource pre-broken into its plurality of finite elements, where each of the finite elements includes the corresponding categorical tag previously created therefore, along with the pre-created searchable database for the plurality of finite elements. Therefore, such a storage device would essentially provide a searchable document that includes the entire content of the informational resource along with a search engine that has been fined tuned by an expert with intimate knowledge of the informational resource, so that end users of the CD ROM (or other type of storage device) would be able to take advantage of the expert's knowledge and experience in searching through the informational resource contained therewith.

Figure 3:
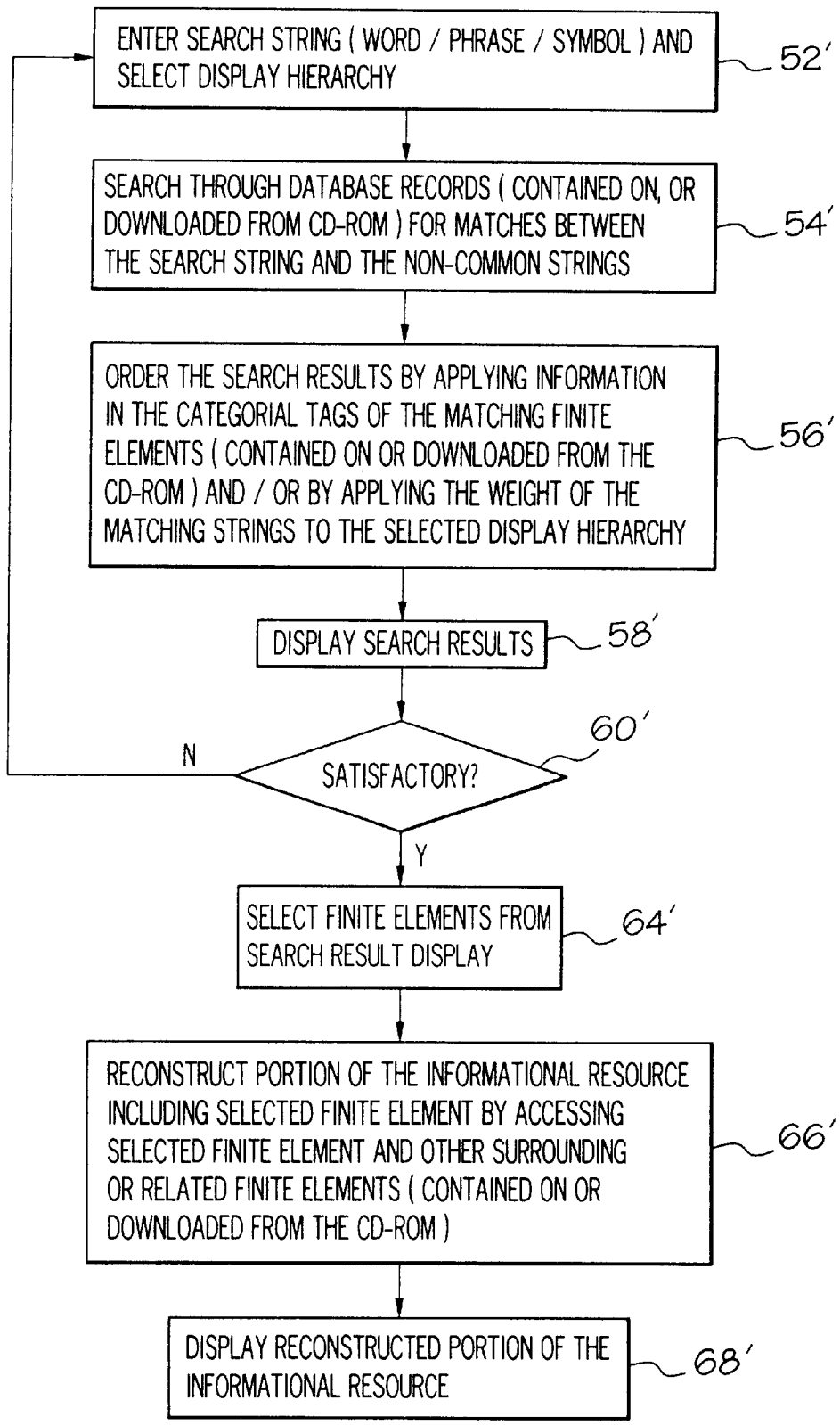
FIG. 3 is a flow-chart representation of an operation of a second embodiment of the invention, resident on a data storage device such as a CD ROM.

As shown on FIG. 3, a flow chart representation of an embodiment of the invention resident on a data storage device, such as a CD ROM, is presented. Essentially, this embodiment is equivalent to the embodiment described in FIGS. 2A and 2B above, except that the development of the rule sets are not longer required. As shown in functional block 52', a first step would be for the end user to enter a search string and select a display hierarchy. In functional block 54', the next step would be for the search module to search through the database records contained on or downloaded from the CD ROM to match the search string with the non-common strings contained in the searchable database records. As shown in functional block 56' the next step would be for the search module to order the search results by applying information in the categorical tags of the matching finite elements (which are contained in, or are downloaded from the CD ROM) and/or by applying the weight of the matching strings to the selected display hierarchy as discussed above. As shown in functional block 58' the next step is to display the search results in preferably a collapsible/expandable hierarchy. As shown in functional block 60', the end user, upon viewing the search results will determine whether or not the results are satisfactory. If not satisfactory, the process will return to functional block 52' where the end user will input a new search string and/or will select a new display hierarchy. If the display results of step 58' are satisfactory, the process will advance to functional block 64' where the end user will select one of the finite elements from the search results display. Advancing to functional block 66' the un-break module will reconstruct the portion of the information resource that includes the selected finite element by accessing the selected finite element and the other surrounding or related finite elements from the CD ROM to create the contiguous portion of the informational resource that included the finite element.

In another embodiment of the present invention the information management, retrieval and display system may be specifically configured to search through a number of individual Web pages resident on the Internet and to display the results of the search in an collapsible/expandable format based upon a user selected display criteria or hierarchy. In such an embodiment, a break module in the form described above may not be necessary because each Web page may already be considered a "finite element" and the search engines will not be able to modify the Web pages. Therefore, with such an embodiment, the search engine will also not be able to insert the categorical into the finite elements. Therefore, in this embodiment, the categorical tags may be either stored separately from the finite elements or incorporated directly into the database records. Furthermore, it is envisioned that the Web page creators may desire to create their own categorical tags for their Web pages rather than having the search engine create one for them. With this feature, the Web page designer may be able to influence the search results, perhaps to achieve a more accurate description of his or her Web site. Of course, in such a feature may also be used by the Web designers in a deceptive manner, where the categorical tag will cause the Web page to be listed in search results when the searcher is looking for an entirely different type of information. Recognizing this potential problem, the index module may include an option where it will compare the actual contents of the Web page against the embedded categorical tags inserted by the Web page designer, and may create a new categorical tag to be inserted in the database record for the Web page if there is a significant difference between the two. Likewise, the search engine can be configured to include an optional filter that will filter out Web sites having unsavory contents as indicated by the embedded categorical tags or as determined upon a review of the content of the Web page itself.

Figure 4:
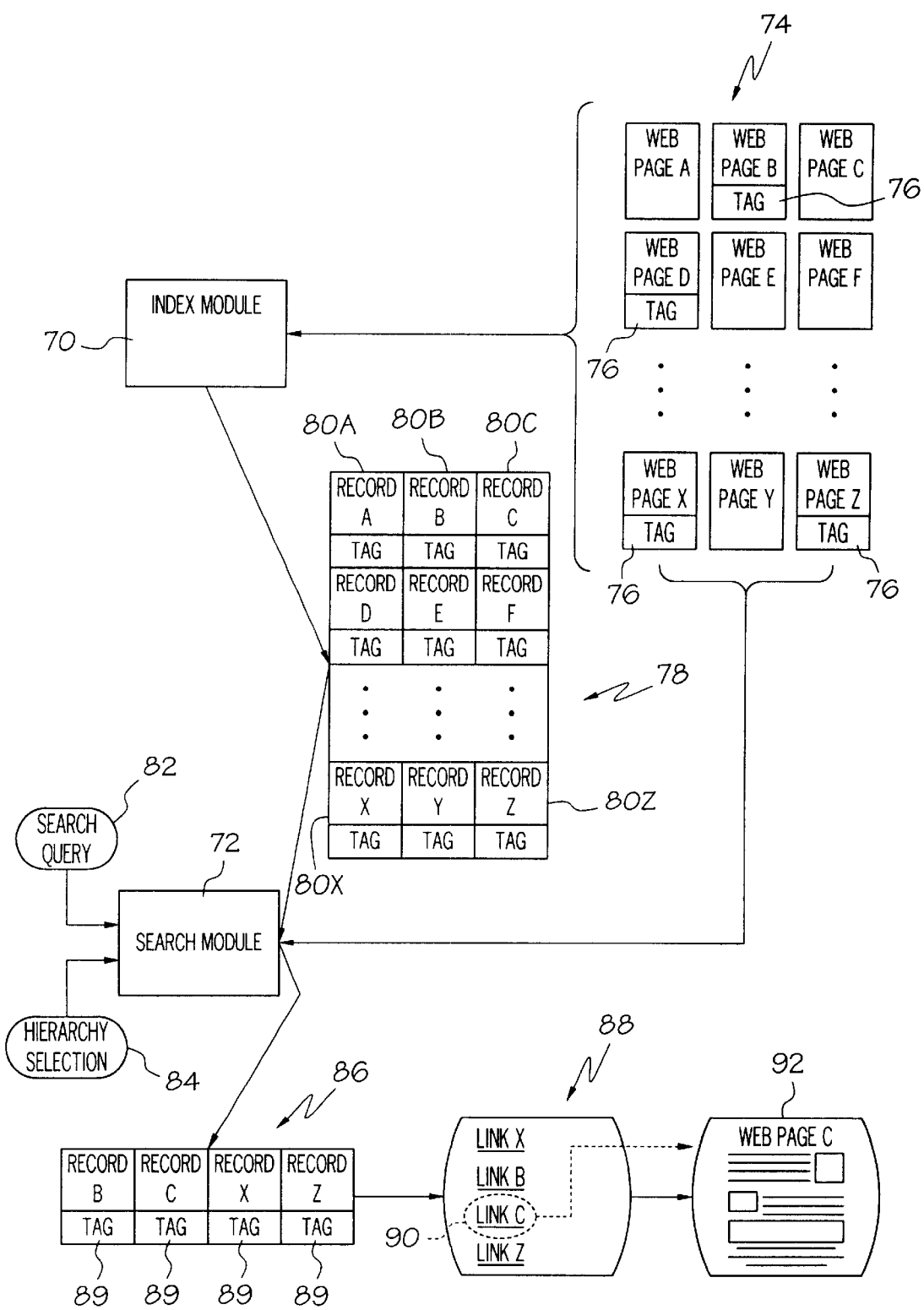
FIG. 4 is a schematic flow-diagram representation of the operation of a third embodiment of the present invention.

As shown in FIG. 4, in such an embodiment of the invention, the information management, retrieval and display system includes two primary modules, an index module 70 and a search module 72. Each of these processing modules are preferably expert engines operating upon a set of expert rules that define the operation of the individual module. The index module 70 will periodically crawl through the volume of Web pages 74 utilizing a conventional Web crawling or Web searching technology such as a spider technology, which is adapted to examine each Web page (or as many as possible) provided on the Internet. As shown in FIG. 4, several of the Web pages may include a predefined, embedded categorical tag 76 included therewith. As discussed above, such an embedded tag 76 would be inserted in the Web page by the Web page designer so that the search engine of FIG. 4 would utilize this predefined embedded categorical tag rather than creating one on its own. An example of a rule from the expert rule set for defining the categorical tag in this embodiment would be to identify the most prominent word or phrase on the initial screen appearing when the Web site is accessed.

The index module 70 will also create a searchable database 78 including a database record 80a–80z for each of the Web pages accessed above. This searchable database 78 is a type of reverse index or each record 80a–80z includes a link to a corresponding Web page, all words contained within the Web page (preferably excluding common words) along with their frequency of appearance within the Web page, and a categorical tag created by the index module or a copy of the categorical tag that was included in the particular Web page as described above. It is envisioned that the index module would constantly be re-accessing the Web pages 74 and updating the searchable database 78, since the contents of Web pages are also constantly being updated or changed.

When a user wishes to conduct a search using the search engine, the user will enter a search query 82 and select an optional hierarchical selection 84. The search query may be any conventional search query as available to those or ordinary skill in the art, it may include a search word or phrases and/or operators tying the words together. The hierarchy selection informs the search module the type of display format that the user wishes to see the results displayed within. Specifically, the hierarchy selection will inform the search module whether or not the search results are to be displayed in an order or structure based entirely upon the information contained within the categorical tags (research-centric), if the search results are to be displayed in an order depending entirely on the frequency of the key words or phrases present within the finite elements (conventional), or if the search results are to be displayed in an order or structure based upon a combination of the two (document-centric).

The search module 72 utilizing a search query 82 to search through the database records 80a–80z so as to find the database records 86 matching the words or phrases in the search query. The search module will then, depending upon the selected hierarchy 84, display the search results 88 in an order or in a collapsible/expandable tree structure based upon information from the categorical tags 89 included within the data base records 87 matching the search query. From the display 88, the user will make a selection 90 of a link to a Web page that he or she wishes to view and the search module will then display the Web page 92 on the display screen.

Figure 5A:
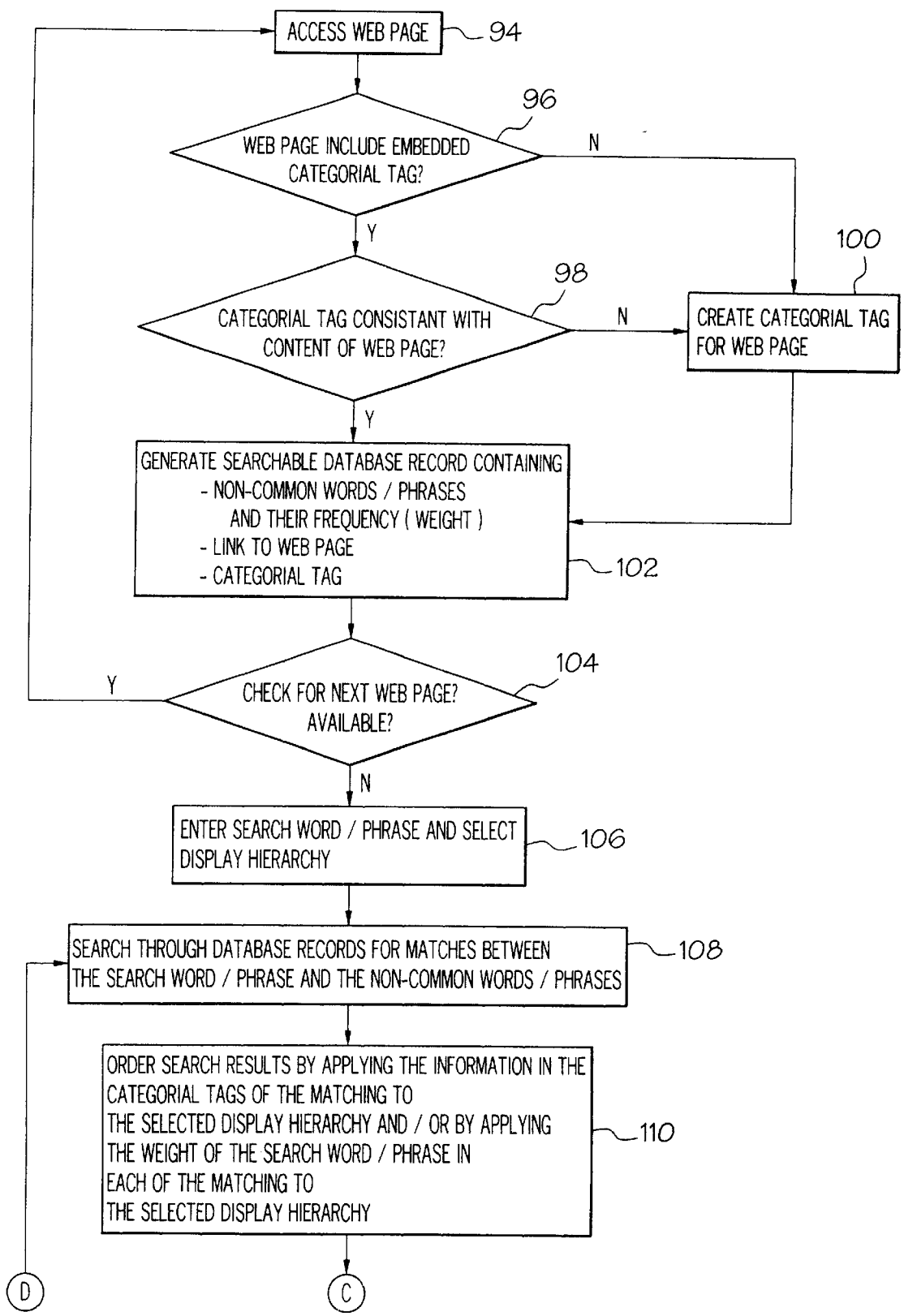
FIGS. 5A and 5B are flow-chart representations of the operation of the embodiment illustrated in FIG. 4.
Figure 5B:
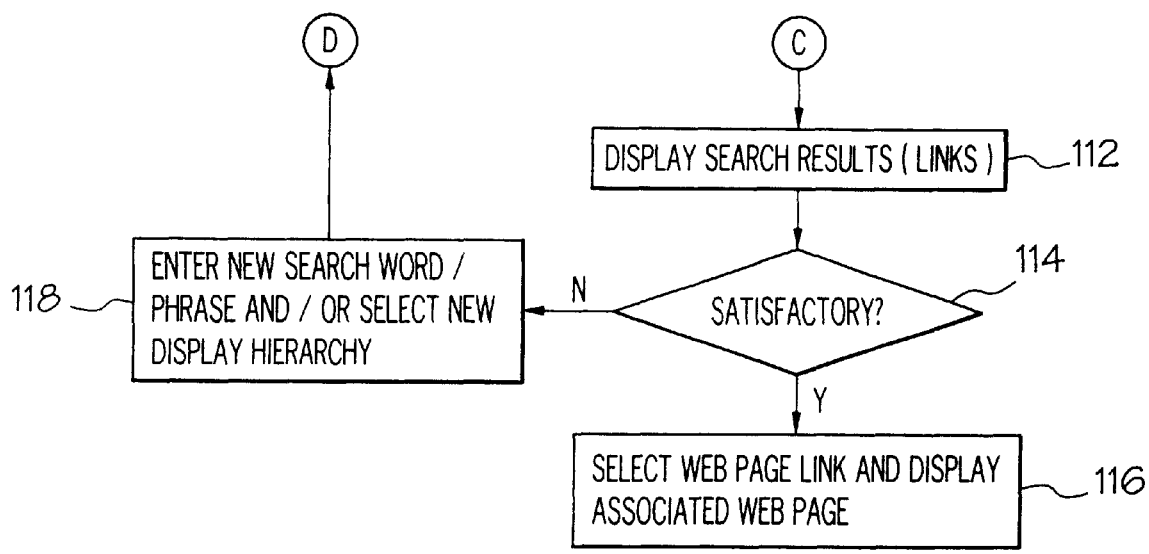

FIGS. 5A and 5B provides a flow chart representation of an operation of the embodiment described above in FIG. 4. As illustrated in the function block 94, a first step is to access a Web page on the Internet. In functional block 96, the next step is to determine whether the access Web pages includes an embedded categorical tag. If the Web page includes an embedded categorical tag the process would advance to functional block 98 where the process will determine whether the embedded categorical tag is consistent with the content of the Web page. If the Web page does not include an embedded categorical tag or if the categorical tag is not consistent with the content of the Web page, the process will advance to functional block 100 where a categorical tag will be created for the Web page. If the embedded categorical tag is consistent with the content of the Web page in step 98 or if the categorical tag is created for the Web page in step 100, the process will advance to functional block 102 where a searchable database record will be generated for the Web page. This searchable database record will include the non-common words or phrases contained within the Web page and their frequency (i.e., weight) a link to the Web page and the categorical tag embedded within the Web page or created in step 100 above. The process will then advance to functional block 104 to determine whether a next Web page is to be accessed. If so, the process will return to fimctional block 94. If the searchable database is complete, the process will advance to functional block 106 where a user will enter a search word or phase in selected display hierarchy.

Advancing the functional block 108, the search engine will search through database records for matches between the search word or phrase and the non-common word or phrases contained within the database records. Advancing to functional block 110 the search engine will then order the results of the search by applying the information in the categorical tags matching database records to the selected display hierarchy and/or by applying the weight of the search word or phrase in each of the matching database records to the selected display hierarchy. Advancing to functional block 112, the next step would involve displaying the search results on the display screen. In functional block 114, if the search results are satisfactory, the user will select a Web page link on the display screen and the search engine will display the associated Web page selected. If the search results are unsatisfactory, the process will advance to functional block 118 where the user will enter a new search word or phrase and/or select a new display. hierarchy and the process will return to functional block 108 so that another search can be performed.

In the present embodiment, the expert rule sets for creating the categorical tags, and the database records may be defined by an expert utilizing an iterative variation of the above process on a limited portion of the Internet (similar to that as described in FIGS. 2A and 2B above). Once the rule sets have been refined, the rule sets can be applied to the entire Internet. The above described search engine can be operating on a Web site or may be contained in a memory device such as a CD ROM which can be downloaded onto a computer having access to the Internet.

The following Appendix provides example code segments for dividing the Antarctic Treaty into a plurality of finite elements and for creating categorical tags for the finite elements.

TABLE 1

APPENDIX A

1) $line =~ m\<FONT FACE=\"Helvetica,Arial\"SIZE=\d>((\d)\.(\d\d|\d)?\.?(\d\d|\d)?\.?(\d\d|\d)?)([a-zA-Z\A-z\-\_\s]+)\
2) $line =~ m\<P ALIGN=\"CENTER\">(([IXVLDCM]+)\-([e,cir <]+?))<VP>\
3) $line =~ m\<P ALIGN=\"CENTER\">(Extract(s)?\s+from\s+Report\s+of\s+([IXVLDCM]+)(th|st)\s+ATCM[e,cir <]*)\i
4) Simple variable substitutionaaa A Hashtable is generated using the code:
##########################################################

TABLE 1-continued

APPENDIX A

```
        #       SUB: gen_hashes
        #
        # Purpose: To generate a tables based on a set pattern from an
        #       files related to the Antarctic Treaty Project.
###############################################################################
        sub gen_hashes
        {
            my $FileList = @_[0];
              print "FileList: $FileList<br>\n";
          print "Generating Year-Roman Numeral and Year-Major Document Name Hashes.\n\n";
          print "Processing";
              while ($InputFN"=glob("$FileList"))
                    {
                         open (InFile, "<$InputFN") || die("Cannot open $InputFN\n$?");
                         print ".";
              while (defined($line = <InFile>))
                         {
                                chomp($line);
                # Remove unwanted characters from the line
              $line = rem_all($line);
                # print $line;
                # Begin Matching
                # Attempt to grab the last for digits of a line, if they are on the line
                if ($line =~ m\e,cir (\w+\w+\w+\w+|\w+\w+\w+), ?(\w+|\w+\w+|\w+\w+\w+),? ?(\d|\d\d)
(\w+)?-(\d|\d\d)(\w+)?\w+ (\d\d\d\d)\)
                                {
                                    # Debugging Code
                                                #print "$1 $2 $3 $4 $5 $6 $7 $8 $9 $10\n";
                                                $MajorDoc =$1;
                                    $year= $7;
                    if("$year"ne"")
                                            {
                                            if(defined($NextLine = <InFile>))
                                                    {
                                                    # Remove unwanted characters from the line
                                                          $NextLine = rem_all($NextLine);
                                                    # Match the Roman Numerals at the beginning of the
                                                    # next line
                                                    if ($NextLine =~ m\e,cir ([IVXLCDM]+)\)
                                                            {
                                    $RomanNumeral = $1;
                                                    $YearTrans{$RomanNumeral} = $year;
                                                                    $DocTrans{$year} = $MajorDoc;
                                                                    }
                                                    }
                                            }
                                }
                            }
                            close InFile;
                    }
                    print "\n";
            }
        }
        Then, when the Dewey tag is written out, the ATCM is placed in the appropriate position, whether it be the
first, second, or third level using the Year from the currently matched pattern to obtain the correct ATCM from the
hashtable (DocTrans table specifically) as generated above.
5) Simple variable substitutionaaa A Hashtable is generated using the code:
###############################################################################
        #       SUB: gen_hashes
        #
        # Purpose: To generate a tables based on a set pattern from an
        #       files related to the Antarctic Treaty Project.
###############################################################################
        sub gen_hashes
        {
            my $FileList = @_[0];
              print "FileList: $FileList<br>\n";
          print "Generating Year-Roman Numeral and Year-Major Document Name Hashes.\n\n";
          print "Processing";
              while ($InputFN = glob("$FileList"))
                    {
                         open (InFile, "<$InputFN") || die("Cannot open $InputFN\n$!
                         print ".";
              while (defined($line = <InFile>))
                         {
                                chomp($line);
                # Remove unwanted characters from the line
              $line = rem_all($line);
```

TABLE 1-continued

APPENDIX A

```
#   print$line;
    #Begin Matching
    # Attempt to grab the last for digits of a line, if they are on the line
    if ($line =~ m\e,cir (\w+\w+\w+\w+|\w+\w+\w+), ?(\w+|\w+\w+|\w+\w+\w+),? ?(\d|\d\d)
(\w+)?-(\d|\d\d)(\w+)?\w+(\d\d\d\d)/)
        {
            # Debugging Code
                #print "$1 $2 $3 $4 $5 $6 $7 $8 $9 $10\n";
                $MajorDoc = $1;
            $year = $7;
    if ("$year" ne "")
        {
            if (defined($NextLine = <InFile>))
                {
                    #   Remove unwanted characters from the line
                        $NextLine = rem_all($NextLine);
                    # Match the Roman Numerals at the beginning of the
                    # next line
                    if ($NextLine =~ m\e,cir ([IVXLCDM]+)\)
                        {
            $RomanNumeral = $1
                $YearTrans{$RomanNumeral} = $year;
                    $DocTrans{$year} = $MajorDoc;
                        }
                    }
                }
            }
        close InFile;
    }
    print "\n";
}
```

TABLE 2

1) <meta name="Dewey" content="Seventeenth Antarctic Consultative Meeting%%=%%%%=%%%%=%%%%=%% Article XII">
2) <meta name="Dewey" content="CONSERVATION OF ANTARCTIC MARINE LIVING RESOURCES%%=%%Convention on the Conservation of Antarctic%%=%%%%=%%%%=%%1981 Article VI Relationship to existing conventions relating to the conservation of whales and seals">
3) <meta name="Dewey" content="Resolutions and Measures adopted at the XIXth Antarctic Treaty Consultative Meeting%%=%%Annex C%%=%%Resolutions%%=%%%%=%%Resolution 8">
4) <meta name="Dewey" content="Seventeenth Antarctic Consultative Meeting%%=%%%%=%%%%=%%%%=%% Article XII">
5) <meta name="Dewey" content="1980%%=%%Convention on the Conservation of Antarctic%%=%%%%=%%%%=%%1980 Article While the systems and methods described herein constitute preferred embodiments of the invention, it is to be understood that the invention is not limited to these precise forms, and that changes may be made therein without departing from the scope of the invention.

What is claimed is:

1. A data storage device comprising:

an informational resource divided into a plurality of finite elements, each of the finite elements including a categorical tag and a database record assigned thereto, the categorical tag including at least one information item taken from a group consisting of content data pertaining to the content of the finite element, location data pertaining to a location of the finite element with respect to the informational resource, organization data pertaining to the placement of the finite element within an organizational framework of the informational resource, author data, owner data, and timing data; and software instructions programmed to direct retrieval and display of at least a portion of the informational resource, the software instructions being configured to perform the steps of:

supplying a search query, searching through the database records for relevant database records matching the search query;

arranging the results of the searching step in a hierarchal structure according, at least in part, to the information in the categorical tags assigned to the finite elements corresponding to the relevant database records; and displaying identifying phrases for the finite elements corresponding to the relevant database records in the hierarchal structure.

2. The method of claim 1 wherein said hierarchical structure is a collapsible/expandable hierarchal structure which can be collapsed/expanded as desired by an end user.

3. A method for retrieving information from an informational resource comprising the steps of:

breaking apart the informational resource into a plurality of discrete finite elements;

creating a categorical tag for each of the plurality of discrete finite elements, the categorical tag including a categorical designation pertaining to informational content contained in the discrete finite element;

generating a searchable database including a searchable database record for each of the discrete finite elements;

searching the searchable database for relevant database records;

associating the relevant database records with their respective discrete finite elements;

selecting a multi-tiered hierarchy for displaying identifying phrases pertaining to the respective discrete finite elements of the relevant database records;

ordering the respective discrete finite elements of the relevant database records in at least one tier of the multi-tiered hierarchy according, at least in part, to the categorical designation in the categorical tag created for each of the discrete finite elements;

displaying the identifying phrases pertaining to the respective discrete finite elements of the relevant database records according to the results of the ordering step.

4. The method of claim 3 wherein the categorical designation is based upon a categorical reference system analogous to the Dewey decimal system.

5. The method of claim 3, wherein:

each searchable database record includes string frequency data pertaining to a frequency of certain strings contained in the corresponding finite element; and the method further includes the step of ordering the respective discrete finite elements of the relevant database records in at least another tier of the multi-tiered hierarchy according, at least in part, to the string frequency data for the relevant, discrete finite elements.

6. The method of claim 3 wherein the categorical tag further includes at least one information item taken from a group consisting of location data pertaining to a location of the discrete finite element with respect to the informational resource, organization data pertaining to the placement of the discrete finite element within an organizational framework of the informational resource, author data, owner data, and timing data.

7. The method of claim 3 wherein said breaking apart step includes breaking said informational resource into a plurality of discrete finite elements while tracking the position of each finite elements relative to other finite elements of said informational resource.

8. The method of claim 3 wherein said multi-tiered hierarchy of said selecting step is a collapsible/expandable hierarchal structure which can be collapsed/expanded as desired by an end user.

9. The data storage device of claim 3 wherein the software instructions are configured to supply a hierarchal selection along with said search query.

10. A method for retrieving information from an informational resource comprising the steps of:

breaking apart the informational resource into a plurality of discrete finite elements;

creating a categorical tag for each of the plurality of discrete finite elements, the categorical tag including a categorical designation pertaining to informational content contained in the discrete finite element;

generating a searchable database including a searchable database record for each of the discrete finite elements;

searching the searchable database for relevant database records;

associating the relevant database records with their respective discrete finite elements;

selecting a multi-tiered hierarchy for displaying identifying phrases pertaining to the respective discrete finite elements of the relevant database records;

ordering the respective discrete finite elements of the relevant database records in at least one tier of the multi-tiered hierarchy according, at least in part, to the categorical designation in the categorical tag created for each of the discrete finite elements;

displaying the identifying phrases pertaining to the respective discrete finite elements of the relevant database records according to the results of the ordering step;

selecting one of the displayed identifying phrases;

accessing the respective discrete finite element corresponding to the selected identifying phrase; and reconstructing a contiguous portion of the informational resource around the accessed discrete finite element by combining other discrete finite elements with the accessed discrete finite element.

11. The method of claim 10, wherein the reconstructing step includes the steps of:

reviewing the categorical tag assigned to the accessed discrete finite element for data corresponding to the location of the accessed discrete finite element with respect to the informational resource;

based upon the data corresponding to the location of the accessed discrete finite element, determining the contiguous portion of the information resource to reconstruct; and retrieving other discrete finite elements belonging in the contiguous portion of the informational resource.

12. The method of claim 11, wherein the retrieving step involves the step of reviewing the categorical tags assigned to the other discrete finite elements to determine if the other discrete finite elements belong in the contiguous portion of the informational resource.

13. The method of claim 12, wherein the reconstructing step further includes the step of assembling the accessed discrete finite element and the retrieved discrete finite elements together based upon ordering and locational data contained in each categorical tag of the accessed and retrieved discrete finite elements.

14. A computerized system for retrieving information from an informational resource, comprising:

a break module, adapted to break the informational resource into a plurality of finite elements and to create a categorical tag for each of the finite elements;

an index module, adapted to create a searchable database having a plurality of database records, each database record corresponding to a respective one of the finite elements and including at least a portion of data contained in the finite element; and a search module, adapted to compare a search query with each of the database records and determine which, if any, of the database records are relevant database records;

wherein the search module is further adapted to display search results in a multi-tiered, collapsible/expandable structure according to information in the categorical tags created for each of the relevant database records.

15. The computerized system of claim 14, wherein:

the break module includes an expert system operating upon a first set of expert rules; and the index module includes an expert system operating upon a second set of expert rules.

16. The system of claim 14 wherein said break module is adapted to break the informational resource into a plurality of finite elements while tracking the position of each finite elements relative to other finite elements of said informational resource.

17. A computerized system for retrieving information from an informational resource, comprising:
   a break module, adapted to break the informational resource into a plurality of finite elements and to create a categorical tag for each of the finite elements;
   an index module, adapted to create a searchable database having a plurality of database records, each database record corresponding to a respective one of the finite elements and including at least a portion of data contained in the finite element; and
   a search module, adapted to compare a search query with each of the database records and determine which, if any, of the database records are relevant database records;
   wherein the search module is further adapted to display search results in a multi-tiered, collapsible/expandable structure according to information in the categorical tags created for each of the relevant database records, wherein at least one of the first and second rule sets is recursively tuned by an expert having expert knowledge regarding content and structure of the informational resource.

18. A method for retrieving information from a dynamic data stream comprising the steps of:
   (a) receiving the dynamic data stream;
   (b) dividing the dynamic data stream into a plurality of finite elements, continuously, as the dynamic data stream is received;
   (c) assigning a categorical tag to each of the plurality of finite elements, the categorical tag including data pertaining to a content of the finite element;
   (d) generating a searchable database record for each of the plurality of finite elements, each searchable database record including at least one string contained within the finite element;
   (e) supplying a search query;
   (f) searching the searchable database for searchable database records matching the search query so as to provide search results;
   (g) arranging the results of the searching step in a hierarchal structure according to the information in the categorical tags assigned to the finite elements corresponding to the searchable database records found in the searching step; and
   (h) displaying the results of the searching step in the hierarchal structure.

19. The method of claim 18 wherein said dividing step includes tracking the position of each finite element relative to other finite elements of said data stream.

20. The method of claim 18 wherein said hierarchal structure of said arranging step is a collapsible/expandable hierarchal structure which can be collapsed/expanded as desired by an end user.

21. A method for retrieving a Web page from a plurality of Web pages present on the Internet and for viewing the Web page comprising the steps of:
   (a) assigning a categorical tag to each of the plurality of Web pages, the categorical tag including data pertaining to a content of the Web page;
   (b) generating a searchable database record for each of the plurality of Web pages, each searchable database record including at least one word or phrase contained within the Web page and including the categorical tag assigned to the Web page;
   (c) supplying a search word or phrase;
   (d) searching the searchable database for searchable database records containing the search word or phrase;
   (e) arranging the results of the searching step in a hierarchal structure according, at least in part, to the information in the categorical tags included in the searchable database records found in the searching step; and
   (f) displaying the results of the searching step in the hierarchal structure.

22. The method of claim 21, further comprising the step of:
   reviewing each of the Web pages for an embedded categorical tag contained within the Web page; and
   responsive to finding an embedded categorical tag in the Web page, inserting a copy of the categorical tag within the database record generated for the Web page.

23. The method of claim 22, further comprising the step of, responsive to finding an embedded categorical tag in the Web page, reviewing the content of the Web page and comparing content data contained in the categorical tag against the content of the Web page.

24. The method of claim 23, further comprising the step of, responsive to a determination that content data contained in the categorical tag does not match the content of the Web page, generating a new categorical tag for the Web page and inserting the new categorical tag within the database record generated for the Web page.

25. The method of claim 21 wherein said hierarchal structure of said arranging step is a collapsible/expandable hierarchal structure which can be collapsed/expanded as desired by an end user.

26. A method for retrieving a Web page from a plurality of Web pages present on the Internet and for viewing the Web page comprising the steps of:
   (a) assigning a categorical tag to each of the plurality of Web pages, the categorical tag including data pertaining to a content of the Web page;
   (b) generating a searchable database record for each of the plurality of Web pages, each searchable database record including at least one word or phrase contained within the Web page and including the categorical tag assigned to the Web page;
   (c) supplying a search word or phrase;
   (d) searching the searchable database for searchable database records containing the search word or phrase;
   (e) arranging the results of the searching step in a hierarchal structure according, at least in part, to the information in the categorical tags included in the searchable database records found in the searching step;
   (f) displaying the results of the searching step in the hierarchal structure, wherein the assigning step is performed by an expert system according to a rule set; and the method further comprises the steps of:
   (g) modifying the rule set, responsive to viewing, by an expert having expert knowledge regarding structure of the Web page, unsatisfactory results in the displaying step (f); and
   (h) repeating steps (a) through (g) until the expert views satisfactory results in the displaying step (f).

27. A data storage device comprising:

an informational resource divided into a plurality of finite elements, each of the finite elements including a categorical tag and a database record assigned thereto, the categorical tag including at least one information item taken from a group consisting of content data pertaining to the content of the finite element, location data pertaining to a location of the finite element with respect to the informational resource, organization data pertaining to the placement of the finite element within an organizational framework of the informational resource, author data, owner data, and timing data; and software instructions programmed to direct retrieval and display of at least a portion of the informational resource, the software instructions being configured to perform the steps of:

supplying a search query, searching through the database records for relevant database records matching the search query;

arranging the results of the searching step in a hierarchal structure according, at least in part, to the information in the categorical tags assigned to the finite elements corresponding to the relevant database records; and displaying identifying phrases for the finite elements corresponding to the relevant database records in the hierarchal structure wherein each categorical tag is generated by an expert system having a rule set that has been recursively tuned by an expert having expert knowledge regarding content and structure of the informational resource.

28. A method for retrieving and displaying information from at least one informational resource comprising the steps of:

breaking apart the at least one informational resource into a plurality of discrete finite elements;

creating a categorical tag for each of the plurality of discrete finite elements, the categorical tag including a categorical designation pertaining to informational content contained in the discrete finite element;

generating a searchable database including a searchable database record for each of the discrete finite elements;

receiving a search query;

searching the searchable database for relevant database records that correspond to the search query;

associating the relevant database records with their respective discrete finite elements;

displaying identifying phrases pertaining to the respective discrete finite elements of the relevant database records produced during the associating step;

receiving an input selecting one of the displayed identifying phrases;

reconstructing a contiguous portion of the informational resource around the selected discrete finite element by combining other discrete finite elements with the selected discrete finite element; and displaying said reconstructed contiguous portion.

29. The method of claim 28 wherein said second displaying step includes displaying a reconstructed contiguous portion of a first informational resource while simultaneously displaying a reconstructed contiguous portion of a second informational resource.

30. A method for retrieving information from an informational resource comprising the steps of:

breaking apart the informational resource into a plurality of discrete finite elements;

creating a categorical tag for each discrete finite element, the categorical tag including information pertaining to the location of the discrete finite element relative to other discrete finite elements of the informational resource;

generating a searchable database including a searchable database record for each of the discrete finite elements;

receiving a search query;

searching the searchable database for relevant database records that correspond to the search query; and displaying identifying phrases pertaining to the respective discrete finite elements of the relevant database records produced during said searching step.

31. The method of claim 30 further comprising the steps of receiving an input selecting one of the displayed identifying phrases, and displaying the contents of the finite element that correspond to the selected displayed identifying phrase.

32. The method of claim 30 wherein said second displaying step includes displaying the contents of a finite element of a first informational resource while simultaneously displaying the contents of a finite element of a second informational resource.

* * * * *